United States Patent
Janson

(10) Patent No.: US 7,197,714 B2
(45) Date of Patent: Mar. 27, 2007

(54) OPTIMIZING GRAPHICAL DATA SYNCHRONIZATION BETWEEN A GRAPHICAL CLIENT AND A STATELESS SERVER

(75) Inventor: Peter Fredrik Janson, Sausalito, CA (US)

(73) Assignee: Autodesk, Inc., San Rafael, CA (US)

( * ) Notice: Subject to any disclaimer, the term of this patent is extended or adjusted under 35 U.S.C. 154(b) by 1009 days.

(21) Appl. No.: 09/780,817

(22) Filed: Feb. 9, 2001

(65) Prior Publication Data

US 2002/0109715 A1    Aug. 15, 2002

(51) Int. Cl.
*G06F 17/00* (2006.01)

(52) U.S. Cl. ............. 715/746; 715/744; 715/848; 715/745; 715/747

(58) Field of Classification Search ........ 345/744–747, 345/848, 849–851
See application file for complete search history.

(56) References Cited

U.S. PATENT DOCUMENTS

| | | | |
|---|---|---|---|
| 5,295,243 A * | 3/1994 | Robertson et al. .......... 345/848 |
| 5,619,632 A * | 4/1997 | Lamping et al. ............ 345/441 |
| 5,966,135 A | 10/1999 | Roy et al. | |
| 6,057,854 A | 5/2000 | Davis et al. | |
| 6,331,858 B2 * | 12/2001 | Fisher ........................ 345/582 |
| 6,374,402 B1 * | 4/2002 | Schmeidler et al. ........ 717/167 |
| 6,377,287 B1 * | 4/2002 | Hao et al. ................... 345/853 |
| 6,414,693 B1 * | 7/2002 | Berger et al. ............... 345/641 |

* cited by examiner

*Primary Examiner*—Kristine Kincaid
*Assistant Examiner*—Peng Ke
(74) *Attorney, Agent, or Firm*—Gates & Cooper LLP

(57) ABSTRACT

A method for synchronizing data between a graphical client and a stateless server. Descriptions of one or more root object nodes of a scene is downloaded from the server to the graphical client, wherein the descriptions may include references to other object nodes in the form of unique persistent identifiers for the referenced object nodes with their associated bounding volumes. The bounding volumes for the object nodes are intersected with a view frustum in the graphical client to determine a set of visible and undefined object nodes. Descriptions of the object nodes in the set of visible and undefined object nodes are then downloaded from the server to the graphical client, wherein the descriptions include unique persistent identifiers for the object nodes with their associated bounding volumes. A determination is made whether the downloaded object nodes reference other object nodes, and if so, the steps are repeated for the other object nodes. Moreover, these steps are repeated until the set of visible and undefined object nodes is empty. At that point, the scene can be rendered by the graphical client. However, the steps are repeated when a user-controlled camera changes the scene in the graphical client.

27 Claims, 4 Drawing Sheets

OPTIMIZING GRAPHICAL DATA SYNCHRONIZATION BETWEEN A GRAPHICAL CLIENT AND A STATELESS SERVER

BACKGROUND OF THE INVENTION

1. Field of the Invention

The present invention relates generally to graphics processing software, and in particular, to a method, apparatus, and article of manufacture for optimizing graphical data synchronization between a graphical client and a stateless server.

2. Description of the Related Art

There is a strong trend today in the software industry to replace desktop applications with Web-based solutions. The reasons are many, including the pervasive presence of the Web and the distributed nature of Web-based solutions, thereby allowing for remote data access and customized lightweight client solutions by exploiting a powerful server.

A common problem with desktop applications is that they are typically structured in a way that assumes data is stored locally, e.g., on the hard disk or on a LAN. This creates inefficiencies that limit their usefulness as tools in a distributed environment where network bandwidth is a limited resource.

Thus, there is a need in the art for solutions that provide for better data synchronization between a graphical client and a server. Such solutions should provide for distributed and remote access to large data sets in potentially low bandwidth situations.

SUMMARY OF THE INVENTION

To address the requirements described above, the present invention discloses a method, apparatus, and article of manufacture for synchronizing data between a graphical client and a stateless server. Descriptions of one or more root object nodes of a scene are downloaded from the server to the graphical client, wherein the descriptions may include references to other object nodes in the form of unique persistent identifiers for the object nodes with their associated bounding volumes. The bounding volumes for the object nodes are intersected with a view frustum in the graphical client to determine a set of visible and undefined object nodes. Descriptions of the object nodes in the set of visible and undefined object nodes are then downloaded from the server to the graphical client, wherein the descriptions may include references to other object nodes in the form of unique persistent identifiers for the referenced object nodes with their associated bounding volumes. A determination is made whether the downloaded object nodes reference other object nodes, and if so, the steps are repeated for the other object nodes. Moreover, these steps are repeated until the set of visible and undefined object nodes is empty. At that point, the scene can be rendered by the graphical client. However, the steps are repeated when a user-controlled camera changes the scene in the graphical client.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention describes a method for data synchronization between a graphical client and a stateless server. The stateless server can pool resources and offer better scalability than a connection-oriented server that needs to maintain the state of the graphical client. The present invention also serves to minimize both server and network load. Finally, the present invention can be coupled with a graphical client-based cache that is populated on-demand from a central database stored on the server in response to user-controlled camera movements. Data is structured such that synchronization of the cache with the central database can be carried out as described below, for the purpose of rendering a given scene.

Hardware and Software Environment

Figure 1:
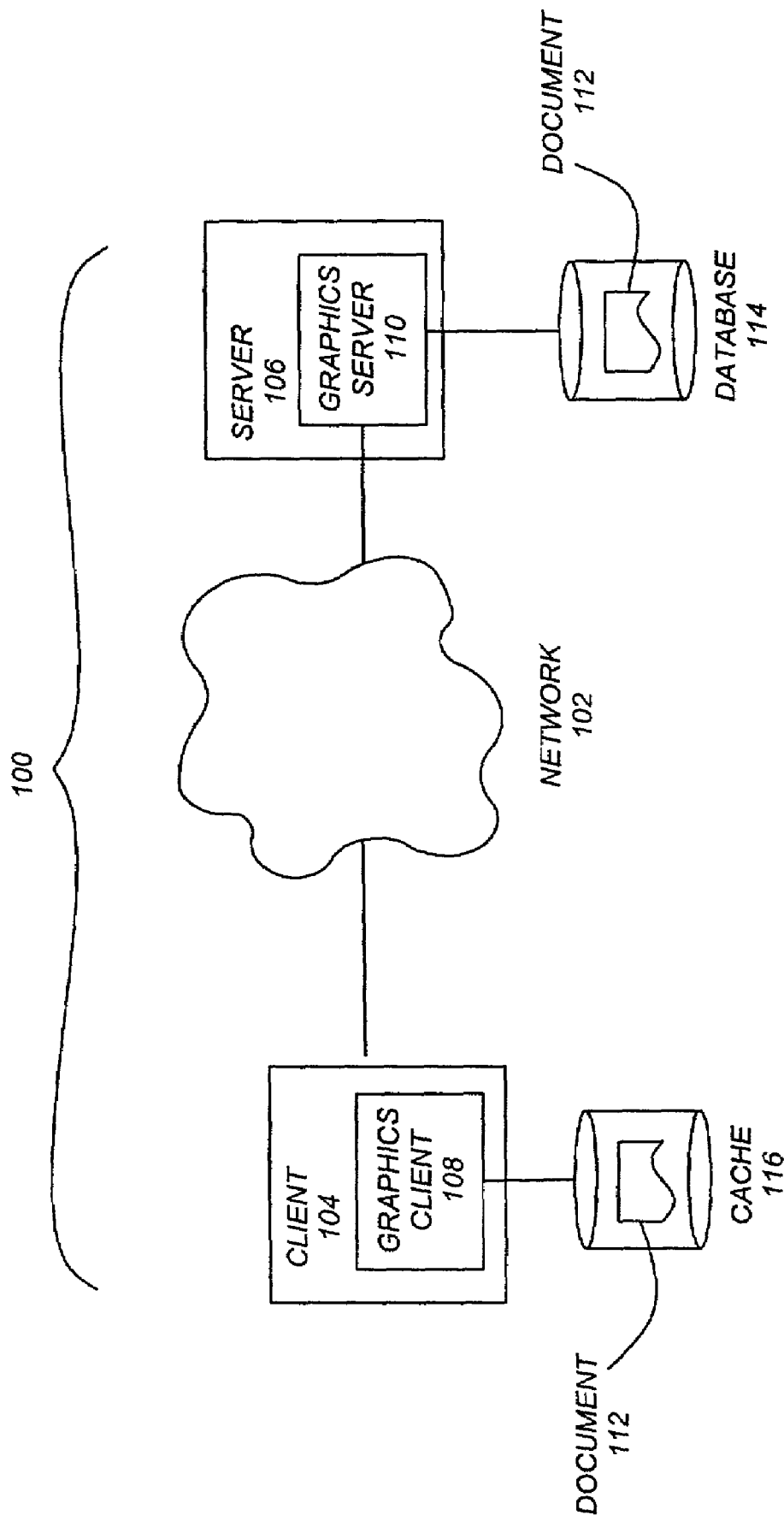
FIG. 1 schematically illustrates a hardware and software environment in accordance with the preferred embodiment of the present invention.

FIG. 1 schematically illustrates a hardware and software environment in accordance with the preferred embodiment of the present invention, and more particularly, illustrates a typical distributed computer system 100 using a network 102 to connect client computers 104 to server computers 106. A typical combination of resources may include a network 102 comprising the Internet, LANs, WANs, or the like, clients 104 that are personal computers or workstations, and servers 106 that are personal computers, workstations, minicomputers, or mainframes.

The network 102 connects a client computer 104 executing a graphics client 108 to a server computer 106 executing a stateless graphics server 110. The graphics client 108 interacts with the graphics server 110 in order to obtain and download one or more documents 112 from a database 114 managed by the server 106 to the client 104, wherein the documents 112 each contain one or more objects that comprise a drawing for subsequent viewing, manipulating and printing. The graphics client 108 includes a cache 116 that is populated with documents 112, and objects contained therein, on-demand by user-controlled camera movements in the graphics client 108. The cache 116 is a local store that contains partial information from the central database 114 stored on the server 106.

Generally, the graphics client 108, graphics server 110, documents 112, database 114, and cache 116 each comprise logic and/or data that is embodied in or retrievable from device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, medium, signal or carrier.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Computer-Implemented Graphics Program

Figure 2:
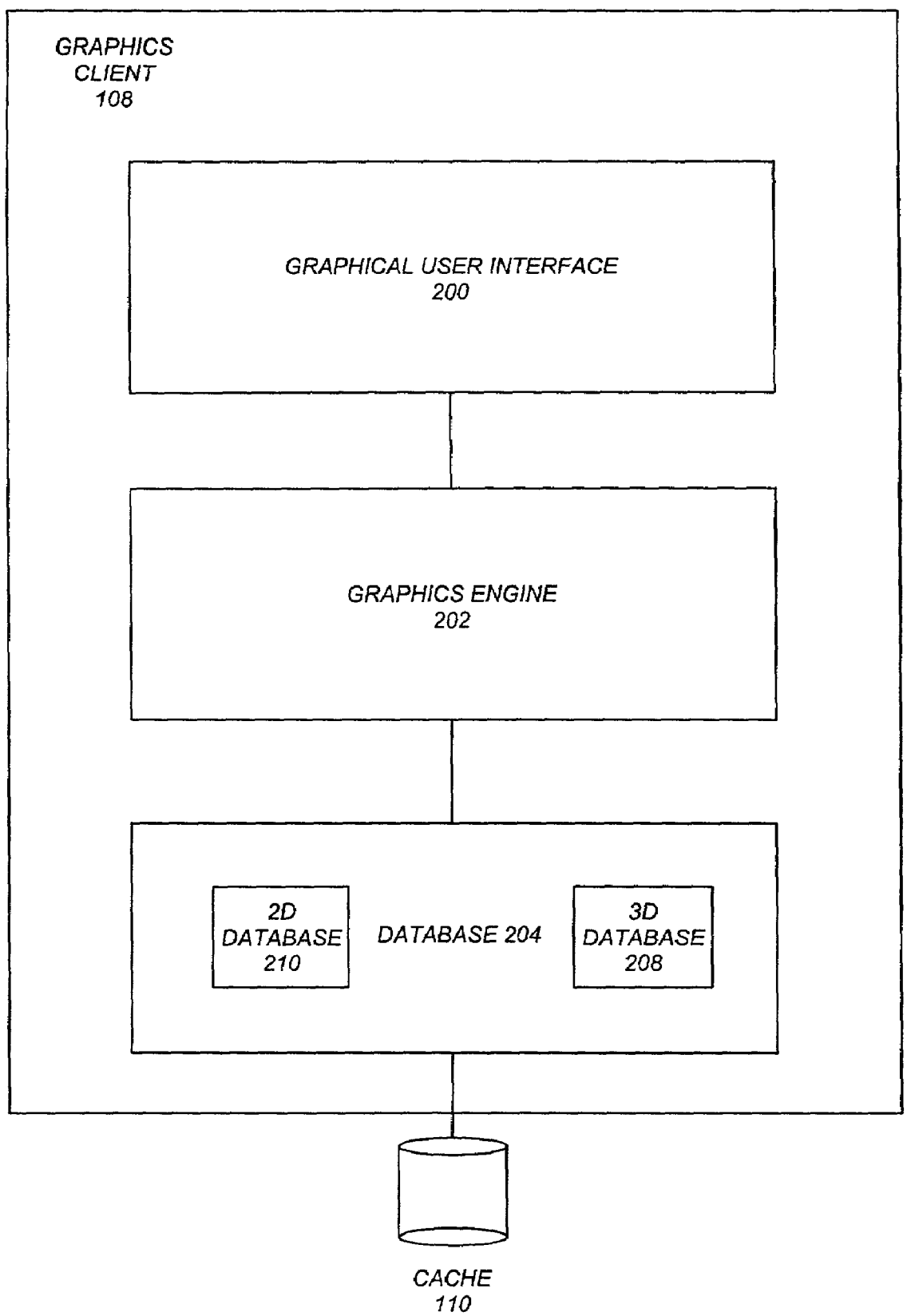
FIG. 2 is a block diagram that illustrates the components of a graphics client according to the preferred embodiment of the present invention.

FIG. 2 is a block diagram that illustrates the components of the graphics client 108 according to the preferred embodiment of the present invention. There are three main components to the graphics client 108, including: a Graphical User Interface (GUI) 200, a Graphics Engine 202, and a Database 204 for storing documents 112, and objects contained therein, that are retrieved from the cache 116.

The Graphical User Interface 200 displays information to the user and provides the functionality for the user's interaction with the graphics client 108.

The Graphics Engine 202 processes the documents 112, and objects contained therein, stored in the Database 204 and delivers the resulting graphics to an output device. Specifically, the Graphics Engine 202 renders scenes from the cache 116, which comprises a local store of graphics data on the client 108, for a GUI window or a printer. In the preferred embodiment, the Graphics Engine 202 provides a complete application programming interface (API) that allows other computer programs to interface to the graphics client 108 as needed.

The Database 204 is comprised of two types of databases: (1) a 3D database 208 known as the "world space" that stores 3D information; and (2) one or more 2D databases 210 known as the "scene," "camera," or "view" that stores 2D information derived from the 3D information.

Object Structure

Figure 3:
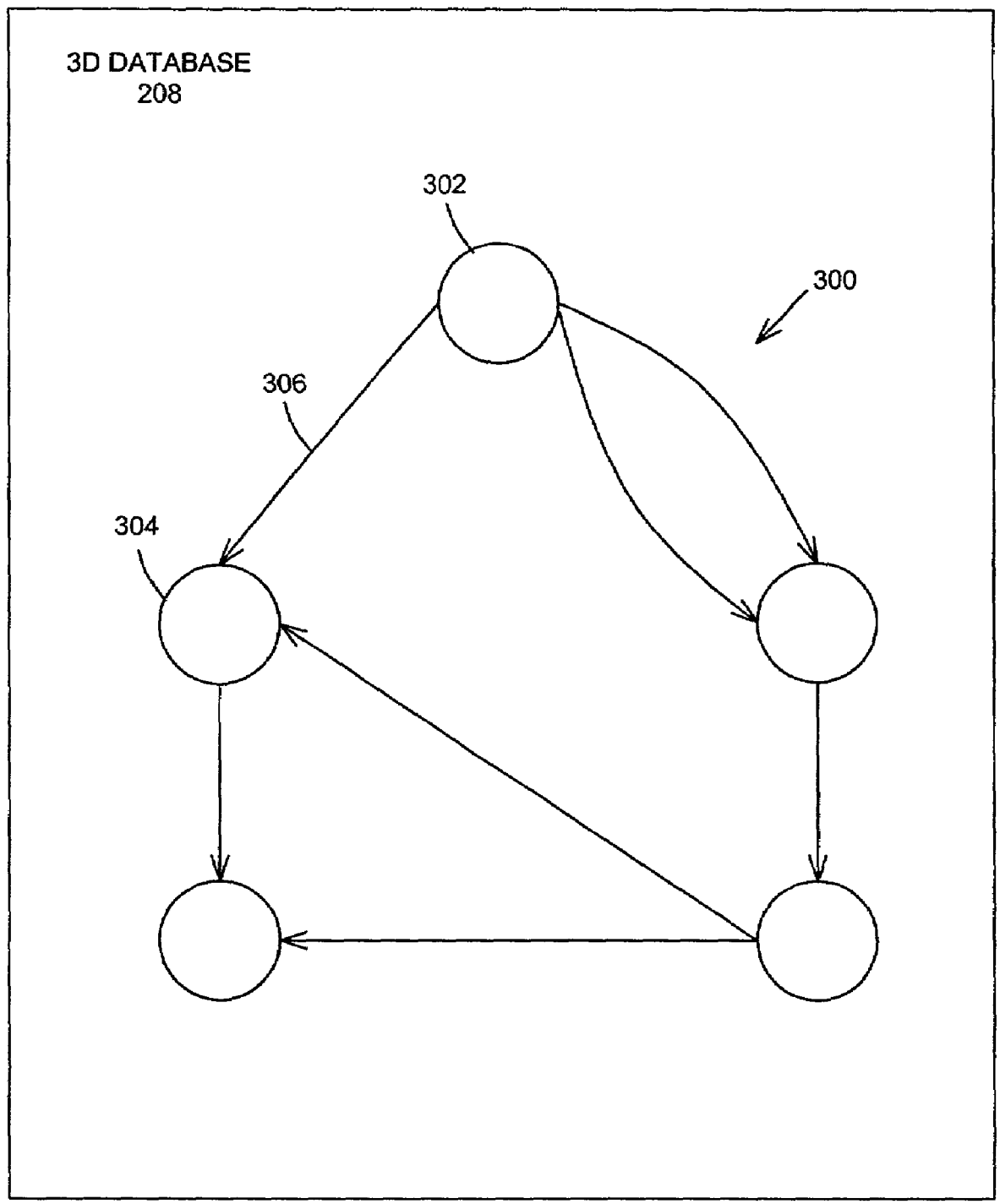
FIG. 3 is a block diagram that illustrates a structure maintained by a three-dimensional database according to the preferred embodiment of the present invention.

FIG. 3 is a block diagram that illustrates a structure maintained by the 3D database 208 according to the preferred embodiment of the present invention. The database 208 comprises a collection of one or more models, wherein each model is a collection of one or more graphical nodes in a hierarchy that forms a directed acyclic graph (DAG). In the preferred embodiment, each graph 300 includes a root object node 302 and one or more object nodes 304 connected by zero or more edges 306.

A node 302 or 304 is a container of geometry (such as lines, curves, polygons, etc.), appearance attributes (such as color, materials, etc.), transformations (such as rotate, scale, translate, etc.), as well as references to other nodes 302 or 304. Every node 302 and 304 has a unique persistent identifier that is used to reference the node 302 and 304. Each reference must also include the bounding volume for the node 302 and 304 it references, or indicate that it is unbounded (i.e., is always visible in visibility computations).

There may be any number of different models maintained by the 3D databases 208, wherein each of the models comprises one or more graphs 300 and each of the graphs 300 is associated with a collection of pre-defined scenes (also known as cameras or views). A scene is a collection of parameter values for rendering a model from a particular perspective and in a particular fashion (such as location, viewing direction, lens length, projection type, wireframe vs. shaded, etc.).

An object node 304 may be a member of multiple graphs 300 in the 3D databases 208. Moreover, a model may be comprised of multiple graphs 300 in the 3D databases 208, and thus is assumed to be associated with a set of one or more pre-defined scenes.

Synchronizing Visible Objects with the Server

To provide enhanced data synchronization between a graphical client 108 and a graphics server 110, a scene is downloaded from the server 106 to the client 104 through a series of steps that each traverse down one level deeper into the visible parts of the graph 300 associated with the scene. To render a given scene, the graphics client 108 must interact with the graphics server 110 to perform the following steps:

1. Download a description of a models root object nodes 302 from the server 106 to the client 104. The description may include references to other object nodes 302 or 304 in the form of unique persistent identifiers for the referenced object nodes 302 or 304 with their associated bounding volumes.

2. Intersect the bounding volumes for the model's root object nodes 302 with a view frustum (the part of the model between two cutting planes defined by the scene) to determine a set of visible and undefined objects (known as a VU set).

3. Download the object node 304 descriptions for the VU set from the server 106 to the client 104. The object node 304 descriptions may, in turn, reference other object nodes 304 that have not been downloaded and these referenced other object nodes 304 are added to the VU set. The process is repeated (i.e., steps 2 and 3 are repeated) until all visible object nodes 304 have been downloaded (i.e., the VU set is empty) and the scene can be fully rendered.

As the user moves or otherwise changes the camera, steps 2 and 3 are repeated to download visible but as yet undefined object nodes 302 and 304 from the server 106 to the client 104.

Pseudo Code

Following is pseudo code that further describes the preferred embodiment of the present invention. This pseudo code uses the following functions:

GraphicsServer.GetViews ([in] model, [out] camera_list)—The graphics server 110 returns a list of pre-defined cameras to the graphics client 108.

Server.GetRootObjects ([in] model, [out] root_set)—The graphics server 110 returns a set of unique persistent identifiers for root object nodes 302, and their associated bounding volumes, to the graphics client 108.

GraphicsEngine.InsertObjects([in] root_set)—The graphics client 108 inserts proxy objects into a graph 300 associated with a scene. These proxy objects are only used for view frustum intersections and for storing the unique persistent identifiers of undefined objects 302 and/or 304.

GraphicsEngine.SetView([in] camera)—The graphics client 108 sets the parameters for the camera.

The pseudo code for the logic performed by the preferred embodiment is described below:

REPEAT

GraphicsEngine.IntersectWithViewFrustum([out] vu_set)

```
//The graphics client 108 intersects the object nodes
    with the view
//frustum and returns a list of visible proxies (as well as
    any
//unbounded proxies).
IF vu_set IS NOT EMPTY
    GraphicsServer.GetObjects([in] model, [in] vu_set,
        [out] object_set)
        //The graphics server 110 returns object node defi-
            nitions that
        //may include references to other object nodes.
    GraphicsEngine.Insertobjects ([in] object_set)
        //This may result in new proxies being created by
            object node
        //definitions that include references to unknown
            object nodes.
END IF
UNTIL vu_set IS EMPTY
```

Logic of the Preferred Embodiment

Figure 4:
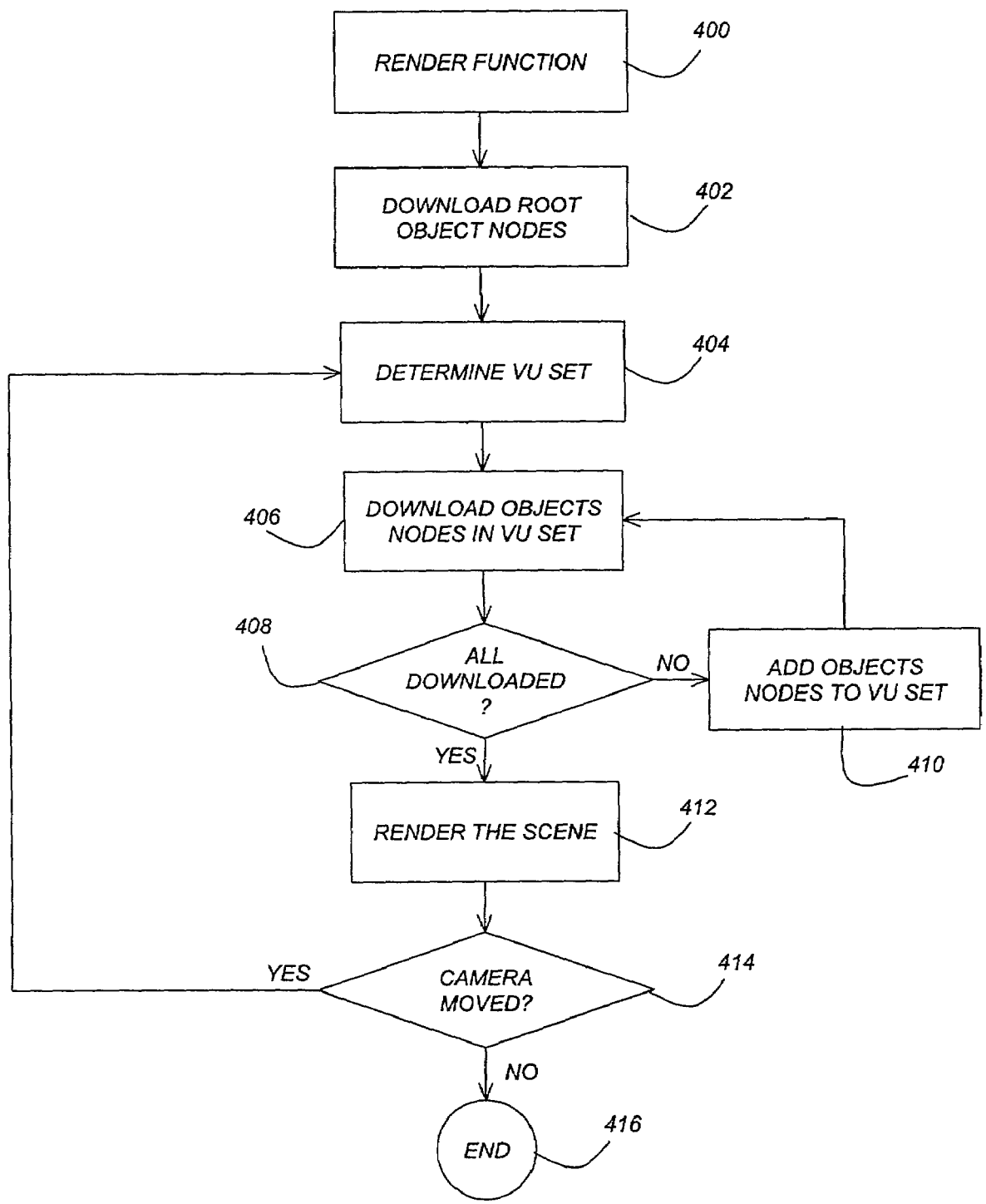
FIG. 4 is a flowchart that illustrates the logic performed by the graphical client program according to the preferred embodiment of the present invention.

A flowchart that illustrates the logic of the present invention according to the preferred embodiment of the present invention is shown in FIG. 4. Those skilled in the art will recognize that this logic is provided for illustrative purposes only and that different logic may be used to accomplish the same results.

Block 400 represents the graphics client 108 initiating the function of rendering a view.

Block 402 represents a description of a model's root object nodes 302 being downloaded from the graphics server 110 to the graphics client 108. This description may include references to other object nodes 302 or 304 in the form of unique persistent identifiers for the referenced object nodes 302 or 304 with their associated bounding volumes.

Block 404 represents the bounding volumes for the root object nodes 302 being intersected with a view frustum to determine the VU set, i.e., a set of visible and undefined objects 302 and/or 304.

Block 406 represents the object node 304 descriptions for the VU set being downloaded from the graphics server 110 to the graphics client 108.

Block 408 is a decision block that determines whether the object node 304 descriptions reference other object nodes 304 that have not been downloaded. If not, control transfers to Block 410; otherwise, all visible object nodes 304 have been downloaded and control transfers to Block 412.

Block 410 represents the graphics client 108 adding the referenced, but not downloaded, object node 304 definitions to the VU set. Thereafter, control returns to Block 406.

Block 412 represents the graphics client 108 fully rendering the scene.

Block 414 is a decision block that determines whether the camera has been moved or otherwise changed. If so, control transfers block to Block 404 to repeat the process; otherwise, the logic terminates at Block 416.

CONCLUSION

This concludes the description of one or more embodiments of the invention. The following describes some alternative embodiments for accomplishing the present invention.

For example, any type of computer, such as a mainframe, minicomputer, work station or personal computer, could be used with the present invention. In addition, any program, function, or operating system that creates or utilizes graphic images could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for synchronizing data between a graphical client and a server, comprising:
    (a) downloading one or more root object nodes of a scene from the server to the graphical client, wherein the scene is a collection of parameter values for rendering a model;
    (b) intersecting bounding volumes for the object nodes with a view frustum in the graphical client to determine a set of visible and undefined object nodes, wherein the view frustum is the part of the model between cutting planes defined by the scene; and
    (c) downloading the object nodes in the set of visible and undefined object nodes from the server to the graphical client, wherein the graphical client renders the scene from the object nodes.

2. The method of claim 1, further comprising:
    (d) determining whether the downloaded object nodes reference other object nodes; and
    (e) repeating steps (b) and (c) for the other object nodes.

3. The method of claim 2, further comprising:
    (f) repeating steps (d) and (e) until the set of visible and undefined object nodes is empty.

4. The method of claim 3, further comprising rendering the scene when the set of visible and undefined object nodes is empty.

5. The method of claim 4, further comprising repeating steps (a) through (f) when a camera changes the scene.

6. The method of claim 1, wherein the downloading step (a) comprises downloading descriptions of the root object nodes from the server to the graphical client, wherein the descriptions include references to other object nodes comprising unique persistent identifiers for the referenced object nodes with their associated bounding volumes.

7. The method of claim 1, wherein the downloading step (a) comprises downloading descriptions of the object nodes from the server to the graphical client, wherein the descriptions include references to other object nodes comprising unique persistent identifiers for the referenced object nodes with their associated bounding volumes.

8. The method of claim 1, wherein the server is a stateless server.

9. The method of claim 1, wherein the graphical client includes a cache.

10. A computer-implemented system for synchronizing data between a graphical client and a server, comprising:
    (a) a graphical client, executed by a computer, including:
        (1) means for downloading one or more root object nodes of a scene from the server to the graphical client, wherein the scene is a collection of parameter values for rendering a model;
        (2) means for intersecting bounding volumes for the object nodes with a view frustum in the graphical client to determine a set of visible and undefined object nodes, wherein the view frustum is the part of the model between cutting planes defined by the scenes; and
        (3) means for downloading the object nodes in the set of visible and undefined object nodes from the server to the graphical client, wherein the graphical client renders the scene from the object nodes.

11. The system of claim 10, wherein the graphical client further comprises:
   (4) means for determining whether the downloaded object nodes reference other object nodes; and
   (5) means for repeating the means for intersecting (2) and the means for downloading (3) for the other object nodes.

12. The system of claim 11, wherein the graphical client further comprises:
   (6) means for repeating the means for determining (4) and means for repeating (5) until the set of visible and undefined object nodes is empty.

13. The system of claim 12, wherein the graphical client further comprises means for rendering the scene when the set of visible and undefined object nodes is empty.

14. The system of claim 13, wherein the graphical client further comprises means for repeating the means for downloading (1) through the means for repeating (6) when a camera changes the scene.

15. The system of claim 10, wherein the means for downloading (1) comprises means for downloading descriptions of the root object nodes from the server to the graphical client, wherein the descriptions include references to other object nodes comprising unique persistent identifiers for the referenced object nodes with their associated bounding volumes.

16. The system of claim 10, wherein the means for downloading (1) comprises means for downloading descriptions of the object nodes from the server to the graphical client, wherein the descriptions include references to other object nodes comprising unique persistent identifiers for the referenced object nodes with their associated bounding volumes.

17. The system of claim 10, wherein the server is a stateless server.

18. The system of claim 10, wherein the graphical client includes a cache.

19. An article of manufacture embodying logic for synchronizing data between a graphical client and a server, the logic comprising:
   (a) downloading one or more root object nodes of a scene from the server to the graphical client, wherein the scene is a collection of parameter values for rendering a model;
   (b) intersecting bounding volumes for the object nodes with a view frustum in the graphical client to determine a set of visible and undefined object nodes, wherein the view frustum is the part of the model between cutting planes defined by the scene; and
   (c) downloading the object nodes in the set of visible and undefined object nodes from the server to the graphical client, wherein the graphical client renders the scene from the object nodes.

20. The article of manufacture of claim 19, wherein the logic further comprises:
   (d) determining whether the downloaded object nodes reference other object nodes; and
   (e) repeating steps (d) and (c) for the other object nodes.

21. The article of manufacture of claim 20, wherein the login further comprises:
   (f) repeating steps (d) and (e) until the set of visible and undefined object nodes is empty.

22. The article of manufacture of claim 21, wherein the logic further comprises rendering the scene when the set of visible and undefined object nodes is empty.

23. The article of manufacture of claim 22, wherein the logic further comprises repeating steps (a) through (f) when a camera changes the scene.

24. The article of manufacture of claim 19, wherein the downloading step (a) comprises downloading descriptions of the root object nodes from the server to the graphical client, wherein the descriptions include references to other object nodes comprising unique persistent identifiers for the referenced object nodes with their associated bounding volumes.

25. The article of manufacture of claim 19, wherein the downloading step (a) comprises downloading descriptions of the object nodes from the server to the graphical client, wherein the descriptions include references to other object nodes comprising unique persistent identifiers for the referenced object nodes with their associated bounding volumes.

26. The article of manufacture of claim 19, wherein the server is a stateless server.

27. The article of manufacture of claim 19, wherein the graphical client includes a cache.

* * * * *

UNITED STATES PATENT AND TRADEMARK OFFICE
CERTIFICATE OF CORRECTION

| | |
|---|---|
| PATENT NO. | : 7,197,714 B2 |
| APPLICATION NO. | : 09/780817 |
| DATED | : March 27, 2007 |
| INVENTOR(S) | : Janson |

It is certified that error appears in the above-identified patent and that said Letters Patent is hereby corrected as shown below:

<u>Column 8</u>:

Claim 20, line 15, please delete "(d)" and insert --(b)--.

Signed and Sealed this

Seventh Day of December, 2010

David J. Kappos
*Director of the United States Patent and Trademark Office*